(12) United States Patent
Iwaki et al.

(10) Patent No.: US 12,308,770 B2
(45) Date of Patent: May 20, 2025

(54) ELECTRIC POWER TOOL, AND PROCESSOR FOR ELECTRIC POWER TOOL

(71) Applicant: MAX CO., LTD., Tokyo (JP)

(72) Inventors: Kozo Iwaki, Tokyo (JP); Norihiro Nagai, Tokyo (JP); Takahiro Hashimoto, Tokyo (JP)

(73) Assignee: Max Co., Ltd., Tokyo (JP)

( * ) Notice: Subject to any disclaimer, the term of this patent is extended or adjusted under 35 U.S.C. 154(b) by 123 days.

(21) Appl. No.: 18/131,936

(22) Filed: Apr. 7, 2023

(65) Prior Publication Data

US 2023/0327594 A1 Oct. 12, 2023

(30) Foreign Application Priority Data

Apr. 8, 2022 (JP) ................ 2022-064769

(51) Int. Cl.
| | |
|---|---|
| H02P 23/00 | (2016.01) |
| B25F 5/02 | (2006.01) |
| H02J 7/00 | (2006.01) |
| H02K 7/14 | (2006.01) |
| H02K 11/00 | (2016.01) |
| H02K 11/33 | (2016.01) |

(52) U.S. Cl.
CPC ........ *H02P 23/0077* (2013.01); *H02J 7/0013* (2013.01); *H02J 7/0063* (2013.01); *H02K 7/145* (2013.01); *H02K 11/0094* (2013.01); *H02K 11/33* (2016.01); *B25F 5/02* (2013.01); *H02K 2211/03* (2013.01)

(58) Field of Classification Search
CPC ... H02P 23/0077; H02J 7/0013; H02J 7/0063; H02K 7/145; H02K 11/0094; H02K 11/33; B25F 5/02
See application file for complete search history.

(56) References Cited

U.S. PATENT DOCUMENTS

| | | | |
|---|---|---|---|
| 2006/0254666 A1* | 11/2006 | Kusakari | .............. E04G 21/122 140/57 |
| 2013/0185548 A1 | 7/2013 | Djabarov et al. | |
| 2017/0060559 A1 | 3/2017 | Ye et al. | |
| 2019/0179629 A1 | 6/2019 | Roy et al. | |
| 2020/0403544 A1* | 12/2020 | Ishikawa | ............. H02P 23/0077 |
| 2023/0034680 A1* | 2/2023 | Ando | ....................... G06F 8/65 |

FOREIGN PATENT DOCUMENTS

| | | | | |
|---|---|---|---|---|
| CA | 3158708 A1 * | 6/2021 | ................ | B25F 5/00 |
| JP | 2020-171056 A | 10/2020 | | |

OTHER PUBLICATIONS

Sep. 6, 2023—(EP) Extended EP Search Report—EP App 23167368.2.

* cited by examiner

*Primary Examiner* — Bickey Dhakal
(74) *Attorney, Agent, or Firm* — Banner & Witcoff, Ltd.

(57) ABSTRACT

There is provided an electric power tool including: an electric motor; a communication device; and a first controller including a first storage section configured to store a control program for driving the electric motor, a second storage section configured to store an update program of the control program that is to be received by the communication device, and a processor configured to drive the electric motor by executing the control program after the communication device starts reception of the update program.

9 Claims, 6 Drawing Sheets

ELECTRIC POWER TOOL, AND PROCESSOR FOR ELECTRIC POWER TOOL

CROSS-REFERENCE TO RELATED APPLICATIONS

This application is based on Japanese Patent Application No. 2022-064769 filed on Apr. 8, 2022, the contents of which are incorporated herein by way of reference.

TECHNICAL FIELD

The present invention relates to an electric power tool.

BACKGROUND ART

In recent years, there is a firmware over-the-air (FOTA) technique in which firmware is received through wireless communication to update firmware of an information terminal.

Patent Literature 1 discloses an information terminal that determines, based on a remaining battery level of a battery mounted on the information terminal, whether or not the FOTA is executable.

Patent Literature 1: JP2020-171056A

However, since the information terminal disclosed in Patent Literature 1 determines, based on the remaining battery level of the battery, whether or not the FOTA is executable, the information terminal is not designed to consume the battery for purposes other than the FOTA after the FOTA is started. Therefore, once the FOTA is started, a user cannot use the information terminal until the FOTA is completed. Therefore, when a firmware updating method described in Patent Literature 1 is applied to an electric power tool, a worker cannot use the electric power tool once the FOTA is started. As a result, the work efficiency is significantly reduced.

Therefore, an object of the present invention is to provide an electric power tool capable of executing FOTA while suppressing a decrease in work efficiency.

SUMMARY OF INVENTION

There is provided an electric power tool including: an electric motor; a communication device; and a first controller including a first storage section configured to store a control program for driving the electric motor, a second storage section configured to store an update program of the control program that is to be received by the communication device, and a processor configured to drive the electric motor by executing the control program after the communication device starts reception of the update program.

The electric motor may be an electric motor configured to drive a binding portion configured to bind reinforcing bars using a wire, the control program may be a control program for driving the electric motor to drive the binding portion, and the electric power tool may be a reinforcing bar binding machine configured to bind the reinforcing bars using the wire.

The electric power tool may be attachable to equipment.

DESCRIPTION OF EMBODIMENTS

Hereinafter, embodiments of the present invention will be described with reference to the drawings. The following embodiments are examples for explaining the present invention, and it is not intended to limit the present invention only to the embodiments.

Figure 2:
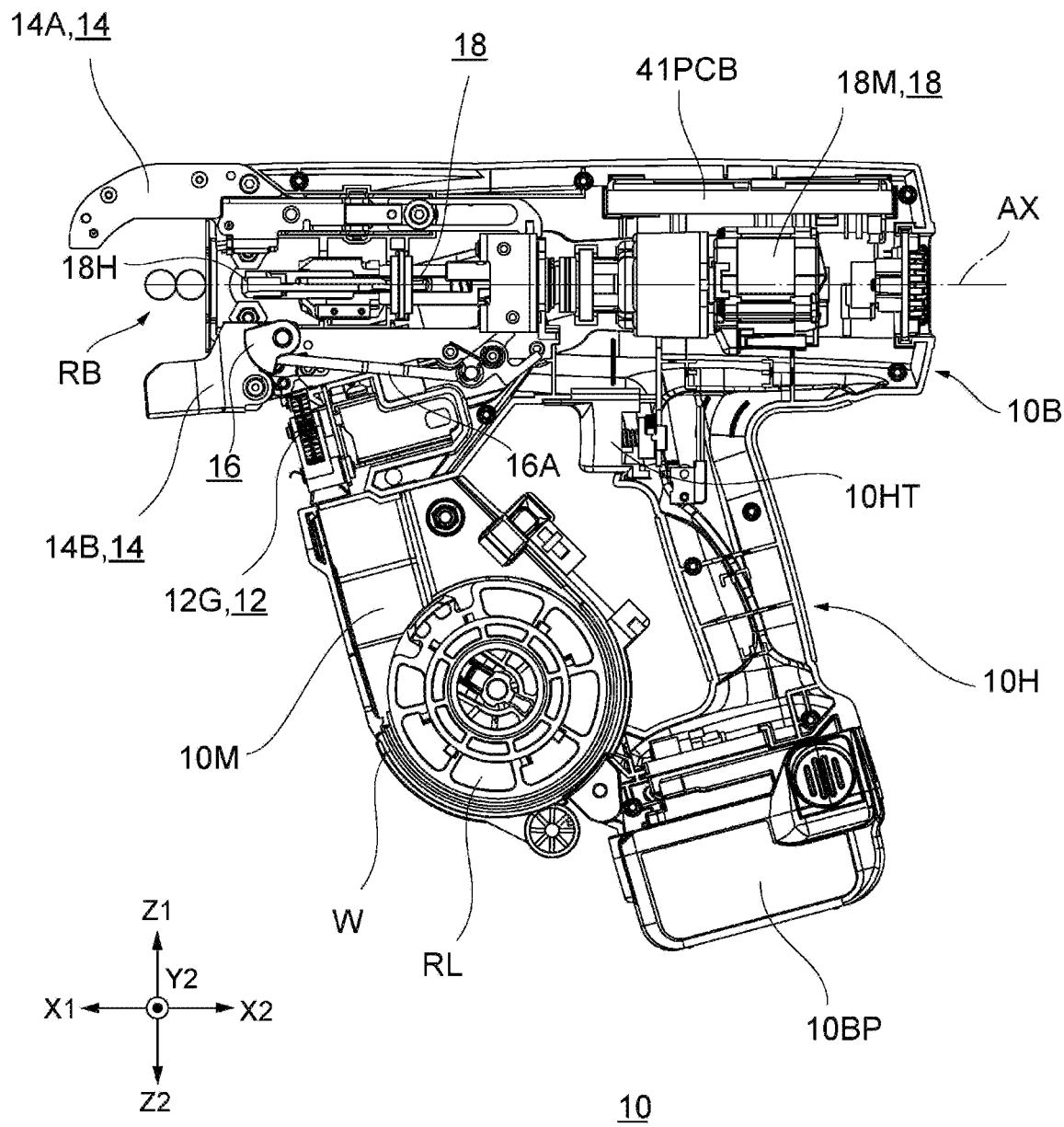
FIG. 2 is a cross-sectional view of the electric power tool according to the embodiment.

For the sake of convenience, a left-right direction of the paper surface of FIG. 2 may be referred to as a front-rear direction X (an example of a "first direction"), and in particular, a left direction of the paper surface may be referred to as a front side X1 and a right direction of the paper surface may be referred to as a rear side X2; an up-down direction of the paper surface may be referred to as an up-down direction Z (an example of a "second direction"), and in particular, an upper direction of the paper surface may be referred to as an upper side Z1 and a lower direction of the paper surface may be referred to as a lower side Z2; a direction perpendicular to the front-rear direction X and the up-down direction Z may be referred to as a right-left direction Y (an example of a "third direction"), and in particular, a right direction may be referred to as a right side Y1 and a left direction may be referred to as a left side Y2 when facing the front side X1. This is used for the purpose of explaining a relative directional relationship, and does not indicate an absolute direction.

Figure 1:
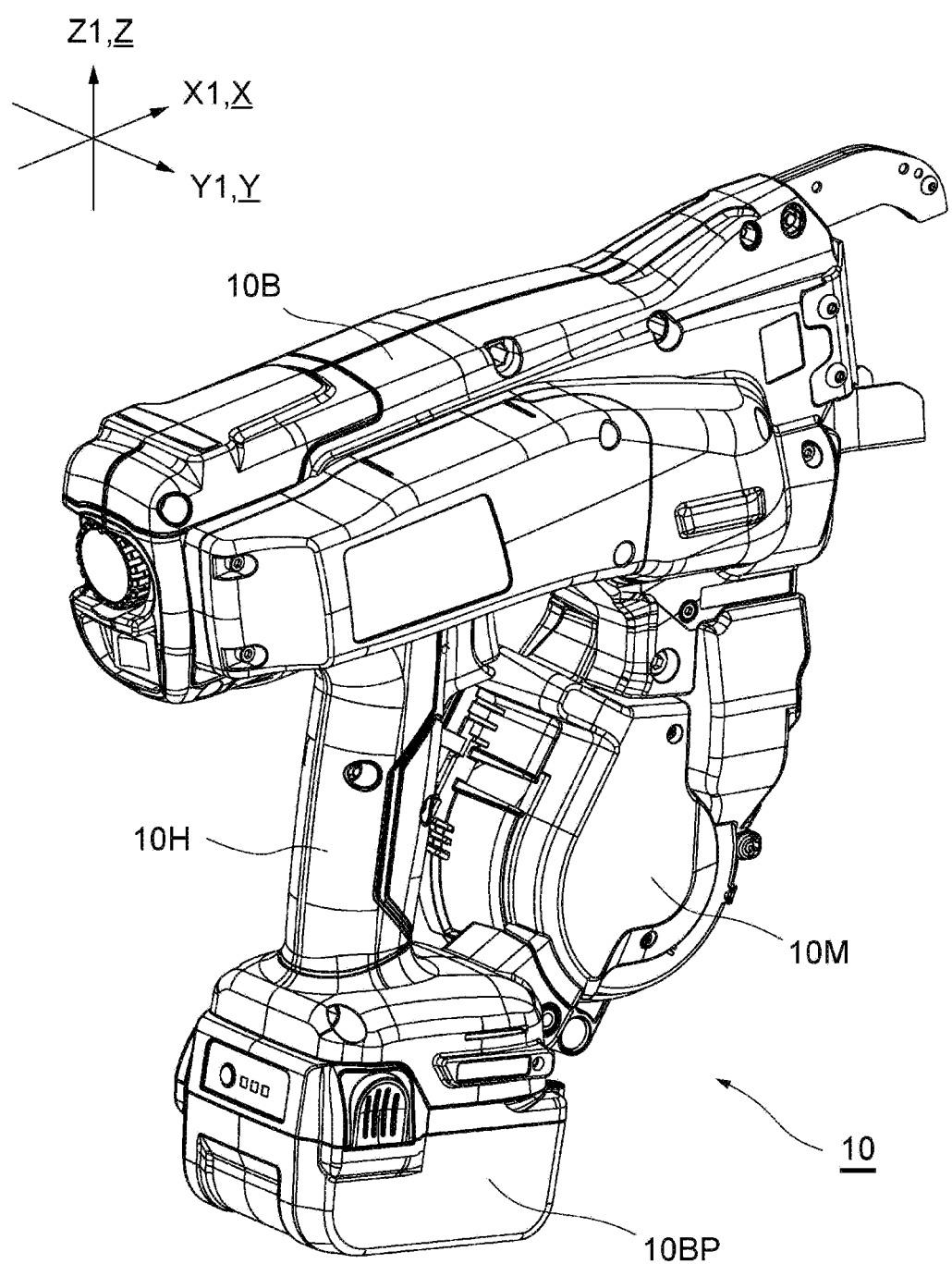
FIG. 1 is a perspective view of an electric power tool according to an embodiment.

Hereinafter, an embodiment in which the present invention is applied to a reinforcing bar binding machine that is an electric power tool will be described. FIG. 1 is a perspective view of a reinforcing bar binding machine 10 that is an electric power tool according to the present embodiment. FIG. 2 is a cross-sectional view obtained by cutting the reinforcing bar binding machine 10, which is the electric power tool, along a cross section perpendicular to the left-right direction Y.

The present invention can be widely applied to an electric power tool that has a communication function and performs work using an electric motor (motor), and can be applied to, for example, a drill, an impact driver, a nailer, a grinder, a reciprocating saw, and a polisher. The motor may be a brushless motor or a motor with brush.

The "electric power tool" of the present invention refers to a tool that uses electricity as a power source and that is used for work such as machining. The "electric power tool" of the present invention includes, in addition to a product used alone, a component or a module that constitutes a part of another device. For example, the "electric power tool" of the present invention may be a module attached to equipment of a robot arm. Further, the "electric power tool" of the present invention may be a component constituting a part of a machine tool having a plurality of functions.

First Embodiment

[Basic Configuration of Electric Power Tool]

The reinforcing bar binding machine 10 according to the present embodiment is configured to bind two reinforcing bars RB or three or more reinforcing bars RB by feeding a wire W outward from an end thereof at the front side X1.

Specifically, the reinforcing bar binding machine 10 includes: a handle 10H to be gripped by a worker; a magazine 10M for accommodating the wire W; a wire feeding portion 12 for feeding the wire W outward from the end at the front side X1; a curl forming portion 14 constituting a traveling path of the wire W for winding the wire W around the reinforcing bar RB; a cutting portion 16 for cutting the wire W wound around the reinforcing bar RB; a binding portion 18 for twisting the wire W wound around the reinforcing bar RB; a tool controller that includes a drive controller 22 for controlling both a feeding motor 12M and a binding motor 18M that are provided in the wire feeding portion 12 and the binding portion 18, respectively; and a communication portion 30 that includes a communication device 32 for the reinforcing bar binding machine 10 to communicate with an external device, and a communication controller 34 for controlling the communication device 32.

In the reinforcing bar binding machine 10 of the present embodiment, the curl forming portion 14, the cutting portion 16, the binding portion 18, the tool controller, and the communication portion 30 constitute a main body 10B of the reinforcing bar binding machine 10. The magazine 10M is provided extending from a lower portion of the main body 10B at the front side X1 to the lower side Z2. The handle 10H is provided extending from a lower portion of the main body 10B at the rear side X2 to the lower side Z2. Thus, the magazine 10M is provided at the front side X1 with respect to the handle 10H, and the handle 10H is provided at the rear side X2 with respect to the magazine 10M. Further, a lower portion of the magazine 10M and a lower portion of the handle 10H are connected to each other. Hereinafter, the configurations will be described.

The reinforcing bar binding machine 10 includes the handle 10H that extends from the main body 10B to the lower side Z2. The handle 10H corresponds to a portion where a worker grips the reinforcing bar binding machine 10. A lower end of the handle 10H is formed such that a main battery 10BP can be detachably attached thereto. A trigger 10HT is provided on a surface of the handle 10H facing the front side X1. The reinforcing bar binding machine 10 is configured such that, when the worker presses the trigger 10HT toward the rear side X2, the tool controller starts a control operation to start a binding operation as will be described later.

The magazine 10M rotatably and detachably houses a reel RL around which the linear wire W is wound. Here, the reel RL is configured to simultaneously feed one or more wires W. The wire W is a linear body suitable for binding the reinforcing bar RB, such as a long metal wire having flexibility (including a coated metal wire).

The wire feeding portion 12 includes a pair of gears 12G configured to advance the wire W by rotating in different directions from each other with the wire W sandwiched therebetween, and the feeding motor 12M (an example of an "electric motor") that drives the gears 12G. The feeding motor 12M includes a rotor and a stator. The wire feeding portion 12 is configured to feed the wire W outward by rotating the rotor of the feeding motor 12M in a forward direction and to pull back the wire W by rotating the rotor in a reverse direction. The tool controller that controls the feeding motor 12M of the wire feeding portion 12 will be described later.

The curl forming portion 14 includes a curl guide 14A configured to curve and curl the wire W fed by the wire feeding portion 12, and an introducing guide 14B configured to introduce the wire W curled by the curl guide 14A to the binding portion 18. The curl guide 14A is configured to curve the wire W into a loop shape by advancing the wire W along an inner wall surface. Therefore, when the wire W is fed in a state where a plurality of reinforcing bars RB are arranged extending in the left-right direction Y in a space between the curl guide 14A and the introducing guide 14B, it is possible to wind the wire W around the reinforcing bars RB.

The cutting portion 16 includes a fixed blade, a movable blade that cuts the wire W in cooperation with the fixed blade, and a transmission mechanism 16A that transmits an operation of the binding portion 18 to the movable blade. The cutting portion 16 is configured to cut the wire W by a rotational operation of the movable blade with the fixed blade serving as a fulcrum shaft. The transmission mechanism 16A is configured to transmit the operation of the binding portion 18 to the movable blade and configured to rotate the movable blade in conjunction with a binding operation of the binding portion 18. Therefore, the transmission mechanism 16A rotates the movable blade in conjunction with the operation of the binding portion 18, whereby the wire W can be cut at a predetermined timing as will be described later.

The binding portion 18 includes a pair of hooks 18H configured to be openable and closable in order to clamp the wire W, a rotary shaft for rotating the pair of hooks 18H with the front-rear direction X as a rotation axis, a speed reducer configured to move the rotary shaft in a rotation axis direction (front-rear direction X) and configured to rotate the rotary shaft moved to the front side X1, and the binding motor 18M configured to be rotatable about a rotation axis AX.

The rotary shaft of the binding portion 18 rotates in a forward direction when the binding motor 18M rotates in a forward direction. A sliding portion is provided around the rotary shaft, and the sliding portion is configured to move toward the front side X1 when the rotary shaft rotates in the forward direction. The wire W fed by the feeding motor 12M in a state where the pair of hooks 18H are opened proceeds while being curved along inner wall surfaces of the curl guide 14A and the introducing guide 14B, and a leading end of the wire W passes through a gap between the pair of hooks 18H. In this state, when the binding motor 18M rotates in the forward direction and the rotary shaft rotates in the forward direction, the sliding portion moves to the front side X1 and the pair of hooks 18H are closed. Therefore, the pair of hooks 18H can clamp the wire W. When the binding motor 18M further rotates in the forward direction and the rotary shaft rotates in the forward direction to move the sliding portion to the front side X1, the movable blade is rotated by the transmission mechanism 16A to cut the wire W. When the binding motor 18M further rotates in the forward direction, the binding portion 18 bends the leading end of the cut wire W in a state where the wire W is sandwiched by the pair of hooks 18H. When the binding motor 18M further rotates in the forward direction, the rotary shaft rotates together with the sliding portion with the front-rear direction X as a rotation axis. The rotary shaft rotates in the state where the wire W is sandwiched by the pair of hooks 18H, whereby the pair of hooks 18H twist the wire W.

[Electric Circuit Configuration]

Figure 3:
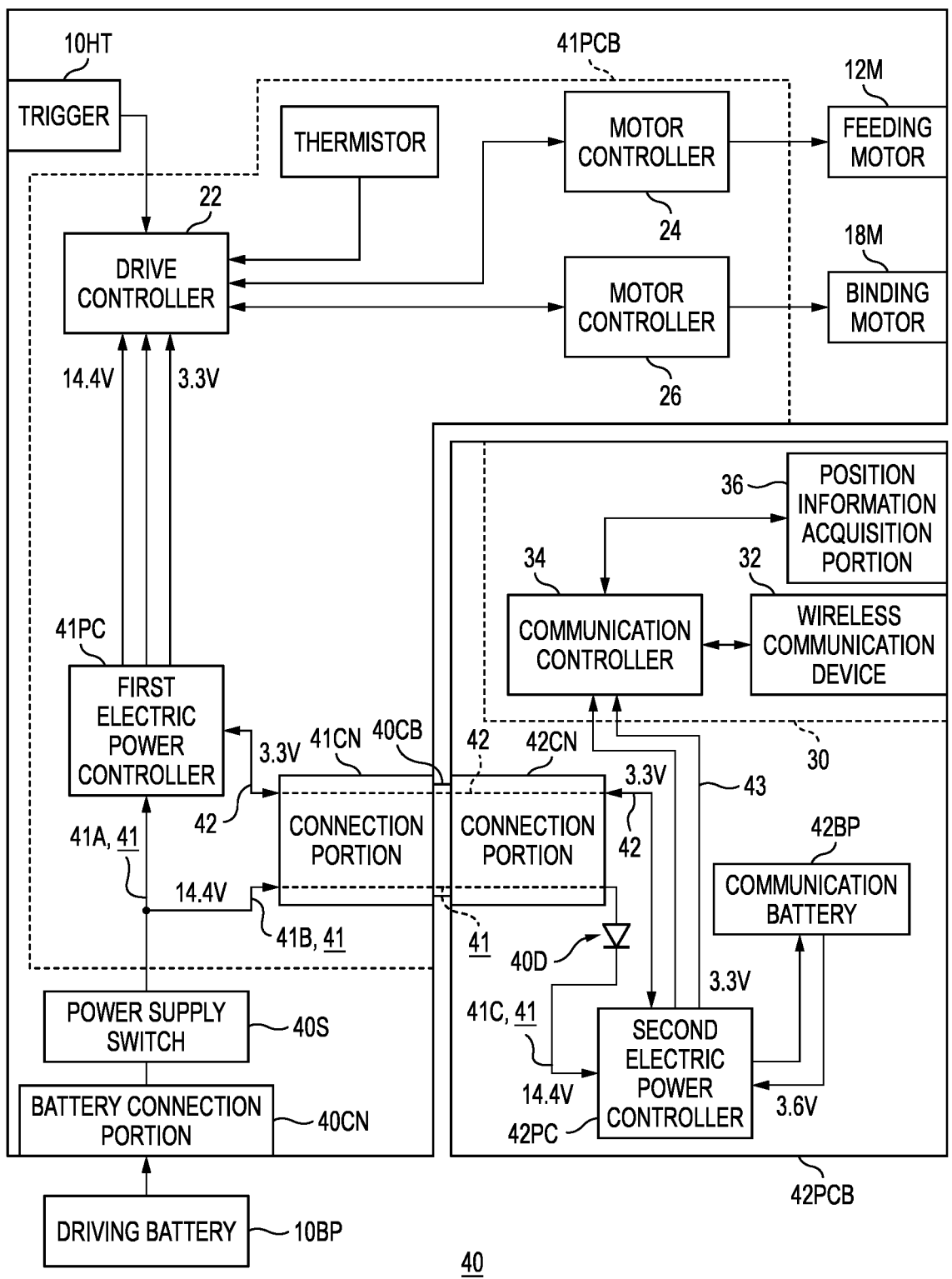
FIG. 3 is a block diagram illustrating an electric circuit configuration of the electric power tool according to the embodiment.

FIG. 3 is a block diagram illustrating an electric circuit configuration of the reinforcing bar binding machine 10 according to the present embodiment. In the electric circuit configuration of the reinforcing bar binding machine 10, a configuration for controlling the feeding motor 12M, a configuration for controlling the communication device 32, and a configuration for supplying electric power (voltage) to these configurations constitute a power supply device 40 of the present embodiment.

Specifically, the power supply device 40 according to the present embodiment includes: a battery connection portion 40CN for receiving supply of electric power (voltage) from the battery 10BP (which may be referred to as a "driving battery" or a "first battery"); a power supply switch 40S for turning on or off supply of electric power (voltage) supplied from the battery connection portion 40CN; a first electric power controller 41PC (an example of a "first voltage supply portion") that receives supply of electric power (voltage) from the battery 10BP via the power supply switch 40S and that supplies, based on a first power supply voltage supplied from the battery 10BP, a first operating voltage for operating the drive controller 22 (an example of a "first controller"); the drive controller 22 that operates based on the first operating voltage and generates a control signal for controlling the feeding motor 12M; and a motor controller 24 that controls a current flowing through the stator of the feeding motor 12M based on the control signal generated by the drive controller 22.

The battery 10BP is configured to supply electric power for operating at least the drive controller 22, the motor controller 24, the feeding motor 12M, the binding motor 18M, the communication controller 34, a wireless communication device 32, and a position information acquisition portion 36, the last three of which are to be described later. The battery 10BP is, for example, a rechargeable lithium ion secondary battery, and has a predetermined rated capacity, rated voltage, and rated current. For example, the battery 10BP has a rated capacity of 5.0 Ah, and is configured to supply a DC voltage having a rated value of 14.4 V. However, as will be described later, the DC voltage supplied from the battery 10BP decreases gradually accompanying power consumption of the battery 10BP.

The battery connection portion 40CN receives supply of the DC voltage from the battery 10BP and supplies the DC voltage to the first electric power controller 41PC. The power supply device 40 includes a first voltage line 41 that connects the battery connection portion 40CN and the first electric power controller 41PC, and the first power supply voltage of DC supplied from the battery 10BP is applied to the first voltage line 41.

According to an operation of a main power supply switch (not illustrated) of the reinforcing bar binding machine 10, the power supply switch 40S turns on or off the supply of electric power (voltage) that is supplied from the battery 10BP to the first electric power controller 41PC via the battery connection portion 40CN. Specifically, when a worker turns off the main power supply switch, the power supply switch 40S cuts off (turns off) the supply of electric power (voltage) from the battery 10BP to the first electric power controller 41PC, and when the worker turns on the main power supply switch, the power supply switch 40S permits (turns on) the supply of electric power (voltage) from the battery 10BP to the first electric power controller 41PC.

The first electric power controller 41PC generates, based on the first power supply voltage supplied from the battery 10BP, a voltage for operating circuit elements including the drive controller 22, and supplies the voltage to the circuit elements and the like. The first electric power controller 41PC (first voltage supply portion) is, for example, a circuit. For example, the first electric power controller 41PC is configured to generate, based on the first power supply voltage of 14.4 V supplied from the battery 10BP, a voltage of 3.3 V (an example of a "first operating voltage") that is an operating voltage of the drive controller 22, and configured to supply the voltage of 3.3 V to the drive controller 22, and configured to further supply the first power supply voltage (14.4 V) to the motor controller 24, a motor controller 26 and stators of respective motors. Here, supplying a voltage includes generating and supplying a voltage, and passing through and supplying a voltage without generating the voltage. The first electric power controller 41PC is configured to further generate an intermediate voltage higher than the first operating voltage and lower than the first power supply voltage and configured to supply the intermediate voltage to different circuit elements. The first electric power controller 41PC may include a booster circuit that is configured to generate a voltage higher than the first power supply voltage and configured to supply the generated voltage to different circuit elements.

The drive controller 22 operates based on a voltage of 3.3 V, for example, to generate a control signal for controlling the feeding motor 12M and supplies the control signal to the motor controller 24. In addition, the drive controller 22 is configured to control other actuators and the like of the reinforcing bar binding machine 10. Further, the drive controller 22 supplies the first power supply voltage, which is supplied from the first electric power controller 41PC, to (for example, a positive power supply line of) the motor controller 24. The drive controller 22 is further configured to receive a signal detecting that the trigger 10HT is pressed, and configured to start a motor control operation based on reception of the signal. In addition, the drive controller 22 may be configured to receive a signal indicating a temperature of the electric power tool (reinforcing bar binding machine 10) from a thermistor and configured to control the feeding motor 12M based on reception of the signal. For example, the drive controller 22 may generate different control signals in cases of a relatively high temperature and a relatively low temperature of the electric power tool and may supply the control signals to the motor control unit 24.

Figure 4:
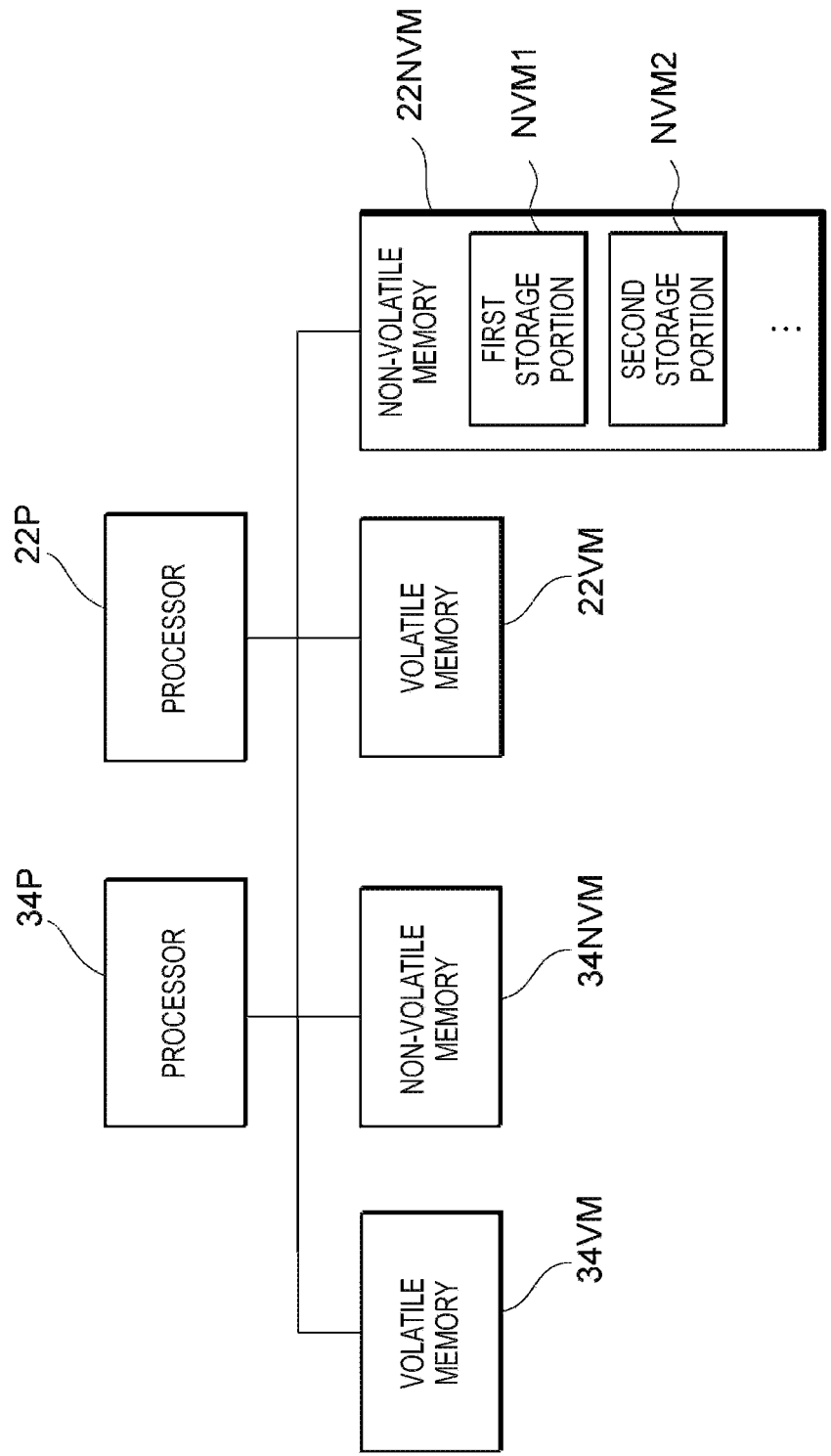
FIG. 4 is a block diagram illustrating a hardware configuration of a drive controller and a communication controller according to an embodiment.

FIG. 4 is a block diagram illustrating a hardware configuration of the drive controller 22 and the communication controller 34. The drive controller 22 includes a single or a plurality of processors 22P implemented by an integrated circuit (IC), a non-volatile memory 22NVM, and a volatile memory 22VM that temporarily stores information in order to execute various types of processing described in the present embodiment. The drive controller 22 (first controller) is, for example, a circuit. The non-volatile memory 22NVM stores firmware that is executed by the processor 22P and that includes a computer command for executing various types of processing described in the present embodiment, and stores information in a non-transitory manner. The non-volatile memory 22NVM includes, for example, an NOR type flash memory and/or an NAND type flash memory. The volatile memory 22VM includes, for example, an SRAM and a DRAM.

As shown in the present embodiment, the firmware includes a control program for generating control commands for driving the feeding motor 12M and the binding motor 18M, respectively.

The non-volatile memory 22NVM has a plurality of divided storage areas. A first storage section NVM1, which is one of the storage areas of the non-volatile memory 22NVM, stores a control program of the feeding motor 12M and the binding motor 18M.

The non-volatile memory 22NVM further includes, as one storage area, a second storage section NVM2 for storing an update program of the control program of the feeding motor 12M and the binding motor 18M. When using the reinforcing bar binding machine 10 for the first time, the second storage section NVM2 stores the same information (control program of the feeding motor 12M and the binding motor 18M). Note that when using the reinforcing bar binding machine 10 for the first time, the second storage section NVM2 may not store information.

Such a drive controller 22 may be implemented by an IC such as an ASIC, an FPGA, a microcontroller, or the like. The drive controller 22 also functions as a part of the tool controller.

The motor controller 24 controls a current flowing through the stator of the feeding motor 12M based on a control signal generated by the drive controller 22. For example, the motor controller 24 may include a plurality of (for example, six) semiconductor elements connected in a three-phase bridge manner between a positive power supply line and a negative power supply line of a ground (reference potential), and a driver circuit for generating and supplying a gate signal (or a base signal) to a gate (or a base) of each semiconductor element.

The feeding motor 12M, which is an electric motor according to the present embodiment, includes, for example, a stator including three-phase windings connected to three-phase outputs of the motor controller 24, and a rotor configured to be rotatable in both forward and reverse directions according to a rotating magnetic field generated by a current flowing through the windings of the stator. The feeding motor 12M may further include, for example, a Hall element for detecting a position of the rotor, and the drive controller 22 may be configured to receive a position signal from the Hall element and generate a control signal based on the position signal.

Similarly, the power supply device 40 includes, for the binding motor 18M, a drive controller that generates a control signal for controlling the binding motor 18M and supplies the control signal to the motor controller 26 of the binding motor 18M, and the motor controller 26 that controls a current flowing through the stator of the binding motor 18M based on the control signal generated by the drive controller. The drive controller of the binding motor 18M and the drive controller 22 of the feeding motor 12M may be provided in the same semiconductor chip.

The power supply device 40 further includes a first circuit board 41PCB on which at least the first electric power controller 41PC, the drive controller 22, the motor controller 24, and the motor controller 26 are mounted. The first circuit board 41PCB is provided with a first connection portion 41CN (an example of a "first connector") for connecting to a second circuit board 42PCB described later via a cable 40CB. As illustrated in FIG. 3, the first voltage line 41 includes a first wiring 41A connecting the battery connection portion 40CN and the first electric power controller 41PC, and a second wiring 41B branching from the first wiring 41A and connected to the first connection portion 41CN. The power supply device 40 further includes a second voltage line 42 to which the first operating voltage (3.3 V) generated by the first electric power controller 41PC can be applied and that connects the first electric power controller 41PC and the first connection portion 41CN. The first circuit board 41PCB in FIG. 3 is drawn conceptually, and the actual first circuit board 41PCB is formed in a rectangular shape having two parallel long sides and two parallel short sides connecting ends of the long sides.

With the above configuration, it is possible to supply electric power for implementing the functions of the electric power tool. Next, a configuration related to a communication function of the electric power tool will be described.

[Communication Function]

As illustrated in FIG. 3, the power supply device 40 includes: a second battery 42BP for communication (also may be referred to as a "communication battery"); a second electric power controller 42PC (an example of a "second voltage supply portion") that is configured to supply, based on a first power supply voltage supplied from the main battery 10BP, a second operating voltage for operating the communication controller 34 (also may be referred to as a "second controller"), and that is configured to supply, based on a second power supply voltage supplied from the second battery 42BP in cases such as one where the main battery 10BP is removed, the second operating voltage for operating the communication controller 34; and the communication controller 34 that controls the wireless communication device 32 (an example of the "communication device 32") and the position information acquisition portion 36 based on the second operating voltage supplied from the second electric power controller 42PC.

The communication portion 30 of the electric power tool includes the position information acquisition portion 36 that acquires position information of the electric power tool and supplies the position information to the communication controller 34, and the wireless communication device 32 for wirelessly transmitting information to and receiving information from an external device.

The position information acquisition portion 36 includes, for example, an antenna configured to receive a signal from a positioning satellite of GPS (or another GNSS such as GLONASS), and a reception circuit that acquires position information of the electric power tool based on the signal received by the antenna.

For example, the wireless communication device 32 includes: an antenna that is configured to transmit information to and receive information from a remote base station according to a predetermined standard by using a frequency band of a licensed band or an unlicensed band based on the LPWA technology; an RFIC that is configured to demodulate an analog signal received by the antenna and supply the demodulated analog signal to a baseband IC, and that is configured to modulate a signal supplied from the baseband IC into an analog signal and configured to transmit the analog signal from the antenna; and the baseband IC that decodes or encodes a signal acquired from the RFIC according to a protocol defined by the standard and transmits and receives information. The communication device 32 may be compatible with a short-distance wireless communication system such as Bluetooth (registered trademark) or a wireless LAN.

With the above-described configuration, for example, the communication controller 34 is configured to provide position information of the electric power tool to an external device by transmitting, from the antenna of the communication device 32, the position information acquired by the position information acquisition portion 36. In the present embodiment, the communication controller 34, the RFIC, and the baseband IC may be stacked in the same semiconductor package. The communication controller 34 and the baseband IC may be formed of the same semiconductor chip.

As illustrated in FIG. 4, the communication controller 34 includes a single or a plurality of processors 34P implemented by an integrated circuit (IC), a non-volatile memory 34NVM, and a volatile memory 34VM that temporarily stores information in order to execute various types of processing described in the present embodiment. The communication controller 34 (second controller) is, for example, a circuit. The non-volatile memory 34NVM stores firmware that is executed by the processor 34P and that includes a computer command for executing communication control processing described in the present embodiment, and stores information in a non-transitory manner. The non-volatile memory 34NVM includes, for example, an NOR type flash memory or an NAND type flash memory. The volatile memory 34VM includes, for example, an SRAM and a DRAM.

As illustrated in FIG. 4, the drive controller 22 and the communication controller 34 are connected to each other by a bus via the connection portion of the first circuit board 41PCB, the cable 40CB, and the connection portion of the second circuit board 42PCB, and are configured to transmit information to and receive information from each other. Accordingly, the communication controller 34 can transmit information received by the communication device 32 to the drive controller 22, and the drive controller 22 can control the feeding motor 12M and the binding motor 18M based on the information received from the communication device 32. The drive controller 22 can transmit information obtained from actuators and sensors of the electric power tool such as the feeding motor 12M and the binding motor 18M to the communication controller 34, and the communication controller 34 can transmit, by using the communication device 32, the information received from the drive controller 22 to an external device.

The power supply device 40 further includes the second circuit board 42PCB on which at least the second electric power controller 42PC, the communication controller 34, the communication device 32, and the position information acquisition portion 36 are mounted. The second circuit board 42PCB is provided with a second connection portion 42CN (an example of a "second connector") for connecting to the first circuit board 41PCB via the cable 40CB. As illustrated in FIG. 3, with respect to the first voltage line 41, the first wiring 41A and the second wiring 41B are formed on the first circuit board 41PCB, and a third wiring 41C electrically connected to the first wiring 41A and the second wiring 41B via the connectors is formed on the second circuit board 42PCB. With respect to the second voltage line 42, a wiring connecting the first connection portion 41CN and the first electric power controller 41PC is formed on the first circuit board 41PCB, and a wiring electrically connected to the former wiring via the connectors and connected to the second electric power controller 42PC is formed on the second circuit board 42PCB.

The second battery 42BP further provided in the power supply device 40 supplies electric power for operating at least the communication controller 34, the wireless communication device 32, and the position information acquisition portion 36. The second battery 42BP is, for example, a rechargeable lithium ion secondary battery, and has a predetermined rated capacity, rated voltage, and rated current. For example, the second battery 42BP has a smaller rated capacity than the main battery 10BP, and is configured to supply a DC voltage having a rated value of 3.6 V (an example of the "second power supply voltage"). In addition, since the second battery 42BP is housed in a housing constituting the main body 10B of the electric power tool, unlike the main battery 10BP, the second battery 42BP is not provided to be easily detachable but is integrally fixed to the second circuit board 42PCB. The second battery 42BP may not be integrally fixed to the second circuit board 42PCB, and may be detachably provided on the second circuit board 42PCB, for example.

The second electric power controller 42PC is configured to generate, based on a power supply voltage supplied from the battery 10BP, a voltage for operating circuit elements including the communication controller 34 and the drive controller 22, and configured to supply the voltage to the circuit elements and the like. The second electric power controller 42PC (second voltage supply portion) is, for example, a circuit. For example, the second electric power controller 42PC generates, based on a power supply voltage of 14.4 V supplied from the battery 10BP, a voltage (an example of a "second operating voltage") of 3.3 V that is an operating voltage of the communication controller 34, and supplies the voltage to the communication controller 34 by a third voltage line 43 connecting the second electric power controller 42PC and the communication controller 34, and similarly, generates a predetermined operating voltage and supplies the predetermined operating voltage to the position information acquisition portion 36 and the wireless communication device 32.

In addition, the second electric power controller 42PC is configured to generate, based on a DC voltage of 3.6 V corresponding to the second power supply voltage supplied from the second battery 42BP, an operating voltage for operating circuit elements and the like, and configured to supply the generated operating voltage to the circuit elements including the communication controller 34 and the drive controller 22. Here, the second electric power controller 42PC includes a booster circuit that is configured to generate a voltage higher than the second power supply voltage in order to operate the antenna. However, the reinforcing bar binding machine 10 may not necessarily include the booster circuit. In the present embodiment, since an operating voltage of the antenna is higher than the second power supply voltage, the reinforcing bar binding machine 10 includes a booster circuit such as a charge pump circuit. However, for example, when a circuit element to be driven by electric power of the second battery 42BP is selected or the second power supply voltage is set such that an operating voltage of the circuit element is equal to or lower than the second power supply voltage, the reinforcing bar binding machine 10 may not necessarily include the booster circuit.

With the above configuration, when the main battery 10BP is removed, the second electric power controller 42PC operates the drive controller 22, the communication controller 34, the position information acquisition portion 36, and the wireless communication device 32 based on the second power supply voltage supplied from the second battery 42BP, thereby enabling wireless transmission and reception of information with an external device. Accordingly, even when the main battery 10BP is removed, the communication controller 34 can provide the position information of the electric power tool to the external device by transmitting, via the wireless communication device 32, the position information acquired by the position information acquisition portion 36, and can store an update program for updating the firmware of the drive controller 22 that is received via the wireless communication device 32 in, for example, a non-volatile semiconductor memory constituting the drive controller 22 as will be described later.

Further, the second electric power controller 42PC is configured to generate, based on the power supply voltage supplied from the main battery 10BP, a charging voltage for charging the second battery 42BP, and configured to charge the second battery 42BP. Accordingly, when the battery 10BP is attached, the power supply device 40 according to the present embodiment is configured to operate the drive controller 22, the motor controller 24, the motor controller 26, the motors (the feeding motor 12M and the binding motor 18M), the communication controller 34, the position information acquisition portion 36, and the wireless communication device 32 based on the electric power supplied from the battery 10BP and configured to charge the second battery 42BP based on the electric power supplied from the battery 10BP. When the main battery 10BP is removed, the power supply device 40 is configured to operate the drive controller 22, the communication controller 34, the position information acquisition portion 36, and the wireless communication device 32 based on the electric power supplied from the second battery 42BP. As described above, since supplying a voltage includes passing through and supplying a voltage without generating the voltage, a voltage serving as a power supply may be supplied to the communication controller 34 and the like by directly connecting a wiring, to which an output voltage from the second battery 42BP is applied, to a power supply terminal of the communication controller 34 and the like, or the voltage serving as a power supply may be supplied to the drive controller 22 and the like by directly connecting a wiring, to which an output voltage from the second electric power controller 42PC is applied, to a power supply terminal of the drive controller 22 and the like.

The power supply device 40 further includes the second circuit board 42PCB on which at least the second electric power controller 42PC, the communication controller 34, the position information acquisition portion 36, and the wireless communication device 32 are mounted. The second circuit board 42PCB is provided with a second connection portion 42CN (an example of a "second connector") for connecting to the first circuit board 41PCB via the cable 40CB.

As illustrated in FIG. 3, the first voltage line 41 to which the power supply voltage from the battery 10BP is applied not only supplies a voltage to the first electric power controller 41PC via the power supply switch 40S, but also supplies a voltage to the second power controller 42PC by including a wiring that is connected to the second electric power controller 42PC via the first connection portion 41CN of the first circuit board 41PCB, the cable 40CB, and the second connection portion 42CN of the second circuit board 42PCB.

Further, the second voltage line 42, to which the first operating voltage (3.3 V) generated by the first electric power controller 41PC is applied, includes a wiring connected to the second electric power controller 42PC and the communication controller 34 via the connection portion of the first circuit board 41PCB, the cable 40CB, and the connection portion of the second circuit board 42PCB. Accordingly, when the main battery 10BP is attached, the second voltage line 42 is configured to supply electric power (voltage and current) in a direction from the first electric power controller 41PC to the second electric power controller 42PC, and when the main battery 10BP is removed, the second voltage line 42 is configured to supply electric power (voltage and current) in a direction from the second electric controller 42PC to the first electric power controller 41PC.

Here, the third wiring 41C of the first voltage line 41 provided on the second circuit board 42PCB is provided with a diode (an example of a "backflow suppression circuit") having an anode connected to a first electric power controller 41PC side and a cathode connected to a second electric power controller 42PC side. The diode serves as a circuit capable of permitting a current to flow from the first electric power controller 41PC to the second electric power controller 42PC and suppressing a current from flowing from the second electric power controller 42PC to the first electric power controller 41PC. The backflow suppression circuit may be provided in the second wiring 41B of the first voltage line 41 provided on the first circuit board 41PCB.

By providing the backflow suppression circuit, it is possible to suppress a current from flowing from the second battery 42BP to the first electric power controller 41PC via the second electric power controller 42PC, and thus it is possible to effectively use the main battery 10BP and the second battery 42BP.

The second voltage line 42 is preferably configured to permit a current to flow from the first electric power controller 41PC (first voltage supply portion) to the second electric power controller 42PC (second voltage supply portion) and to permit a current to flow from the second electric power controller 42PC (second voltage supply portion) to the first electric power controller 41PC (first voltage supply portion).

With such a configuration, the electric power (voltage) can be supplied to the power supply terminal of the drive controller 22 of the first circuit board 41PCB via the second voltage line 42 that connects the second circuit board 42PCB which is a communication board, the second connector, the first connector, and the first electric power controller 41PC.

Therefore, when the main battery 10BP is removed, the drive controller 22 can be operated. For example, as will be described later, the drive controller 22 can update firmware that is a control program. Accordingly, it is possible to reduce a situation where the work of a worker has to be interrupted for updating the firmware of the drive controller 22, thereby improving work efficiency of the worker.

The second voltage line 42 may be provided so as to connect the first connector and the power supply terminal of the drive controller 22 of the first circuit board 41PCB directly without using the first electric power controller 41PC as an intermediary.

[Operations of Reinforcing Bar Binding Machine]

Figure 5:
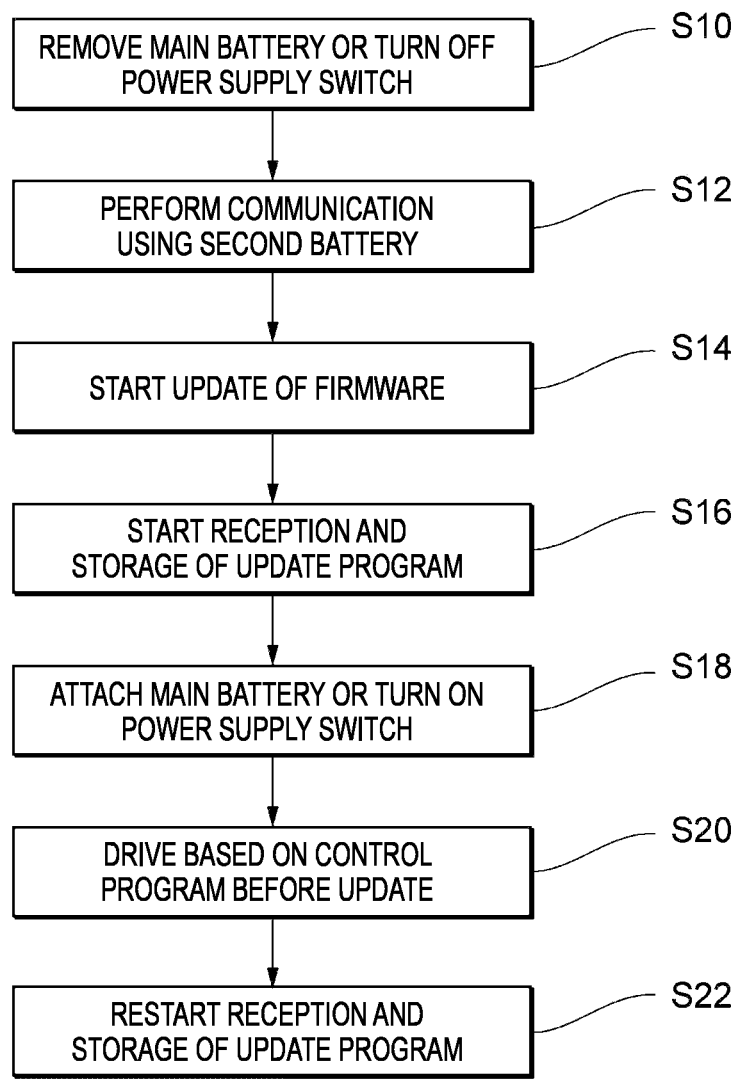
FIG. 5 is a flowchart illustrating an operation at the time of firmware update of a reinforcing bar binding machine.
Figure 6:
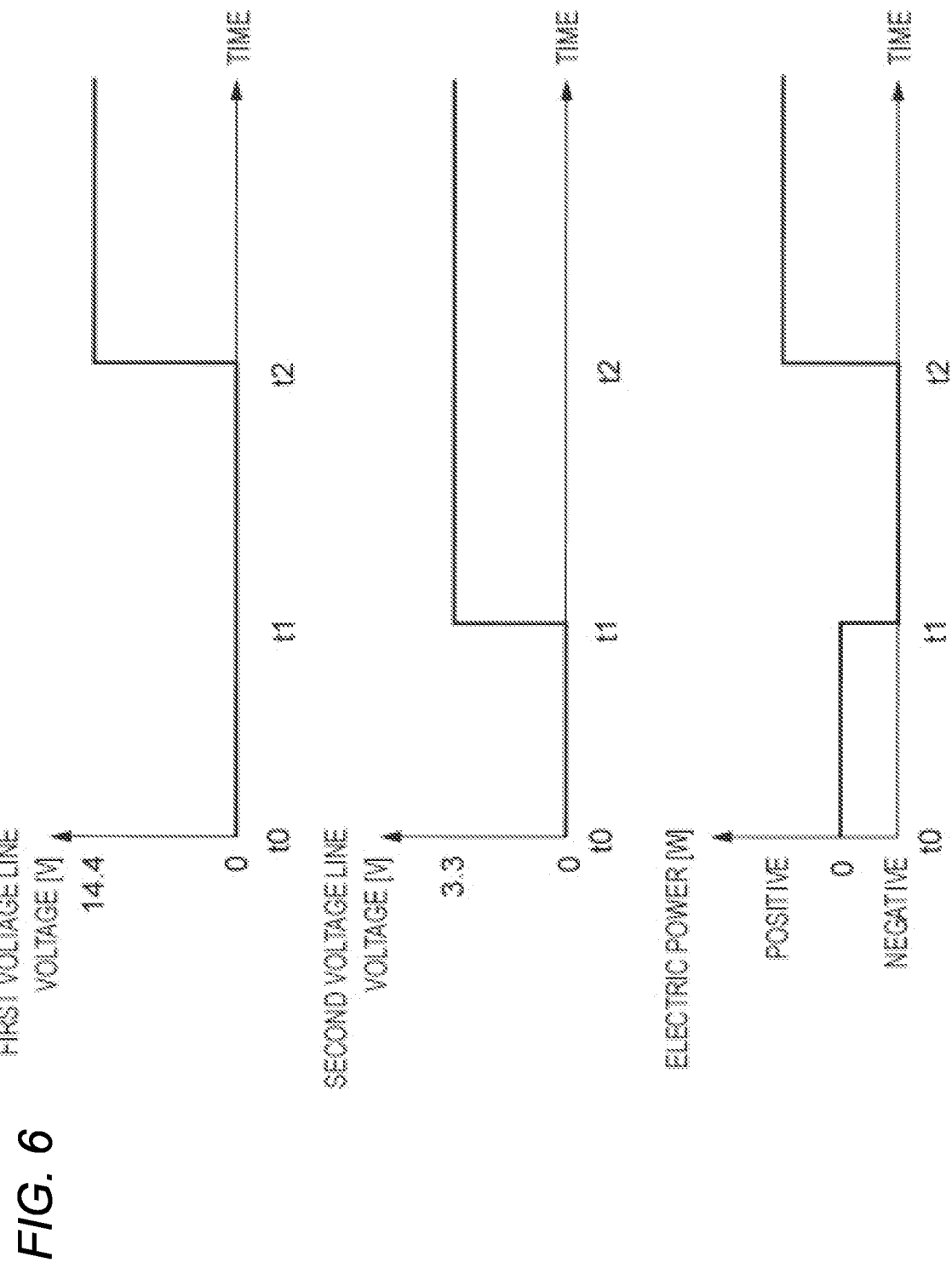
FIG. 6 is a graph illustrating voltages of a first voltage line and a second voltage line in an operating mode of the reinforcing bar binding machine according to the embodiment.

Hereinafter, operations of the reinforcing bar binding machine 10 including an operation of the reinforcing bar binding machine 10 at the time of updating the firmware will be described. FIG. 5 is a flowchart illustrating the operation of the reinforcing bar binding machine 10 at the time of updating the firmware. FIG. 6 is a graph illustrating a voltage state in each operation of the reinforcing bar binding machine 10. The reinforcing bar binding machine 10 according to the present embodiment is configured to execute each operating mode described below.

FIG. 6 also illustrates a supply state of electric power from the second battery 42BP to the circuit elements on the first circuit board 41PCB. When electric power is supplied from the second battery 42BP to the circuit elements on the first circuit board 41PCB, the electric power in the graph in FIG. 6 is negative. At this time, in the wiring of the second voltage line 42 connecting the first circuit board 41PCB and the second circuit board 42PCB, a current flows from the second circuit board 42PCB to the first circuit board 41PCB, and the second battery 42BP supplies electric power to the circuit elements on the first circuit board 41PCB.

On the other hand, when electric power is supplied from the first battery to the circuit elements on the second circuit board 42PCB, the electric power in the graph in FIG. 6 is positive. At this time, a current flows from the first circuit board 41PCB to the second circuit board 42PCB in at least one of the wiring of the first voltage line 41 connecting the first circuit board 41PCB and the second circuit board 42PCB and the wiring of the second voltage line 42 connecting the first circuit board 41PCB and the second circuit board 42PCB, and the first battery supplies electric power to the circuit elements on the second circuit board 42PCB.

When no electric power is supplied from the first battery to the circuit elements on the second circuit board 42PCB and no electric power is supplied from the second battery 42BP to the circuit elements on the first circuit board 41PCB, the electric power in the graph in FIG. 6 is zero. At this time, no current flows through any of the wiring of the first voltage line 41 connecting the first circuit board 41PCB and the second circuit board 42PCB and the wiring of the second voltage line 42 connecting the first circuit board 41PCB and the second circuit board 42PCB.

However, the reinforcing bar binding machine 10 can execute the operating modes in different orders. The electric power tool of the present invention may be configured to execute any one of the operating modes described below, or may be configured to execute any two or more of the operating modes described below.

[Removal of Battery or Turning-Off of Power Suppl Switch 40S]

After finishing the work, the worker removes the main battery 10BP from the lower end of the handle 10H or turns off the power supply switch 40S (step S10). When the main battery 10BP is removed, or when the power supply switch 40S is turned off, the electric motor (the feeding motor 12M and the binding motor 18M) of the reinforcing bar binding machine 10 is not operated and is in a non-operating state. At this time, the communication device 32 of the reinforcing bar binding machine 10 that is an electric power tool executes communication using the sub second battery 42BP as a power supply (step S12). Since operations described below can also be executed by other electric power tools in addition to the reinforcing bar binding machine 10, the reinforcing bar binding machine 10 may be simply referred to as an electric power tool.

In the operating mode from a time point t0 to a time point t1 in FIG. 6, the electric motors and the drive controller 22 of the electric power tool are in the non-operating state and the communication device 32 is in the operating state. At this time, since no DC voltage from the first battery is applied to the first voltage line 41, the first voltage line 41 has a voltage of 0 V (ground level) and no current is flowing in the first voltage line 41. Further, since it is not necessary to operate the circuit elements on the first circuit board 41PCB including the drive controller 22, the second voltage line 42 has a voltage of 0 V (ground level) and no current is flowing in the second voltage line 42. Since no electric power is supplied from the first battery to the circuit elements on the second circuit board 42PCB and from the second battery 42BP to the circuit elements on the first circuit board 41PCB, the electric power in the graph is zero.

At this time, the second battery 42BP supplies the second power supply voltage of 3.6 V to the second electric power controller 42PC, and the second electric power controller 42PC generates, based on a DC voltage of 3.6 V corresponding to the second power supply voltage supplied from the second battery 42BP, an operating voltage for operating circuit elements of the communication portion 30 and the like, and applies the operating voltage (3.3 V) of the communication controller 34 to the third voltage line 43. Similarly, the second electric power controller 42PC generates an operating voltage for operating the circuit elements such as the antenna of the communication portion 30, and supplies the operating voltage to the circuit elements including the communication controller 34. Therefore, the communication portion 30 can be operated.

With the above configuration, even when the main battery 10BP is removed, the electric power tool can provide the position information of the electric power tool to the outside by transmitting, via the wireless communication device 32, the position information acquired by the position information acquisition portion 36. Thus, even when the electric power tool is stolen, the position information of the electric power tool can be acquired.

[Update of Firmware]

The electric power tool updates the firmware by triggering a predetermined event (step S14). For example, when the communication portion 30 of the electric power tool receives an update command of the firmware from an external device, the electric power tool starts firmware update processing. Specifically, the processor 34P of the communication controller 34 starts reception of the update program of the firmware using the communication device 32 (step S14). When the communication device 32 starts reception of the update program, the processor 34P of the communication controller 34 sequentially stores the received update program in the volatile memory 34VM.

The processor 22P of the drive controller 22 (or the processor 34P of the communication controller 34) accesses the volatile memory 34VM via the bus, and updates and stores the update program sequentially in the second storage section NVM2 (step S16).

A period from the time point t1 to a time point t2 in FIG. 6 corresponds to an operating mode at the time of executing the firmware update processing by the electric power tool. At this time, the electric motors of the electric power tool are in the non-operating state, and the drive controller 22 and the communication device 32 are in the operating state. At this time, since no DC voltage from the first battery is applied to the first voltage line 41, the first voltage line 41 has a voltage of 0 V (ground level) and no current is flowing in the first voltage line 41. On the other hand, the second electric power controller 42PC applies the operating voltage (3.3 V) of the drive controller 22 to the second voltage line 42 based on the second power supply voltage supplied from the second battery 42BP. Similarly, the second electric power controller 42PC applies the operating voltage (3.3 V) of the communication controller 34 to the third voltage line 43 based on the second power supply voltage supplied from the second battery 42BP. Similarly, the second electric power controller 42PC generates an operating voltage for operating the circuit elements such as the antenna of the communication portion 30, and supplies the operating voltage to the circuit elements including the communication controller 34. At this time, since electric power is supplied from the second battery 42BP to the drive controller 22 which is a circuit element on the first circuit board 41PCB, the electric power in the graph is negative, and a current in a direction from the second circuit board 42PCB to the first circuit board 41PCB flows through the wiring of the second voltage line 42 connecting the first circuit board 41PCB and the second circuit board 42PCB. Therefore, the drive controller 22 and the communication portion 30 can be operated.

With the above configuration, even when the main battery 10BP is removed or the power supply switch 40S is turned off, the electric power tool is configured to receive the update program of the firmware, which is the control program of the drive controller 22, by using the communication portion 30, configured to store the update program in the second storage section NVM2 (including a case of updating stored data) by using the drive controller 22, and configured to update the firmware based on the update program. Therefore, the firmware can be updated while the worker is not working. Accordingly, the work efficiency can be improved.

[Attachment of Battery or Turning-on of Power Supply Switch 40S]

When starting the work, the worker attaches the main battery 10BP to the lower end of the handle 10H or turns on the power supply switch 40S (step S18). At this time, in a case where the communication device 32 completes the reception of the entire update program and the entire update program is stored in the second storage section NVM2, the processor 22P of the drive controller 22 executes the update program stored in the second storage section NVM2 not the control program stored in the first storage section NVM1, and drives the electric motors (the feeding motor 12M and the binding motor 18M) based on the update program.

On the other hand, there is a case where the worker starts the work before the communication device 32 completes the reception of the entire update program. Specifically, the work is started by turning on the power supply switch 40S. In this case, the processor 22P of the drive controller 22 is configured to drive the electric motors (the feeding motor 12M and the binding motor 18M) based on the control program stored in the first storage section NVM1 (step S20).

As described, since the first storage section NVM1 and the second storage section NVM2 that are two storage sections are provided in the non-volatile memory 22NVM, it is not necessary for the worker to wait for the start of the work until the completion of the FOTA. Thus, it is possible to improve the work efficiency. A period from the time point t2 in FIG. 6 corresponds to an operating mode in which the main battery 10BP is attached and the electric motors, the drive controller 22, and the communication device 32 of the electric power tool are in the operating state. When the worker turns on the power supply switch 40S to perform work, this operating mode starts. At this time, since the DC voltage from the first battery is applied to the first voltage line 41, the first voltage line 41 has a voltage of 14.4 V. When the worker presses down the trigger 10HT in this state, since the motors (the binding motor 18M and the feeding motor 12M) start to be driven, a current flows through the first wiring 41A of the first voltage line 41 toward the stators of the motors via the first electric power controller 41PC.

Further, the first battery is configured to supply electric power to the communication portion 30. Specifically, the first electric power controller 41PC is configured to generate, based on a DC voltage of 14.4 V corresponding to the first power supply voltage supplied from the first battery, a voltage of 3.3 V that is an operating voltage of the communication controller 34, and configured to supply the generated voltage to the communication controller 34 via the second voltage line 42.

In addition, when a battery charge level of the second battery 42BP is low, the first battery is configured to charge the second battery 42BP. Specifically, the second electric power controller 42PC is configured to generate, based on a DC voltage of 14.4 V corresponding to the first power supply voltage supplied from the first battery, a charging voltage for charging the second battery 42BP, and configured to charge the second battery 42BP.

At this time, since electric power is supplied from the first battery to the communication portion 30 and the second battery 42BP on the second circuit board 42PCB, the electric power in the graph is positive, and a current in a direction from the first circuit board 41PCB to the second circuit board 42PCB flows through wirings of the first voltage line 41 and the second voltage line 42 connecting the first circuit board 41PCB and the second circuit board 42PCB.

Here, since the third wiring 41C of the first voltage line 41 is provided with a diode (an example of the "backflow suppression circuit"), when the electric power is supplied from the first battery 10BP to the electric motors to drive the electric motors, it is possible to reduce a situation in which even the electric power of the second battery 42BP is unintentionally consumed for driving the electric motors.

When the main battery 10BP is removed from the lower end of the handle 10H or the power supply switch 40S is turned off after completion of the work, the electric power tool resumes reception and storage of the update program by using the second battery 42BP as a power supply (step S22). When a part of the update program is already stored in the second storage section NVM2, the remaining update program is to be received and stored in the second storage section NVM2. Even when a part of the update program is already stored in the second storage section NVM2, the update program may be received again from the beginning and stored in the second storage section NVM2.

That is, in the electric power tool according to the present embodiment, the processor 22P receives and stores a part of the update program by using the second battery after the first battery is removed from the main body of the electric power tool or after the power supply switch 40S is turned off. Thereafter, the processor 22P stops receiving the update program after the first battery is attached to the main body of the electric power tool or after the power supply switch 40S is turned on. The processor 22P is configured to execute the original control program even after the reception of the update program is started, and the processor 22P is further configured to receive and store the remaining part (other part) of the update program or the entire update program by using the second battery after the first battery is removed from the main body of the electric power tool again or after the power supply switch 40S is turned off again.

With such a configuration, when the main battery 10BP is removed or the power supply switch 40S is turned off, the FOTA is executed, and thus the work efficiency can be improved with the electric power tool according to the present embodiment. Note that the electric power tool according to the present embodiment can be appropriately changed within the scope of the ordinary creative ability of those skilled in the art. For example, the present invention is applicable to an electric power tool other than a reinforcing bar binding machine.

The non-volatile memory 22NVM and the non-volatile memory 34NVM may be made common to each other. Similarly, the volatile memory 22VM and the volatile memory 34VM may be made common to each other. The first storage section NVM1 and the second storage section NVM2 may be provided in different semiconductor chips, or may be provided in different regions (blocks) in the same semiconductor chip.

Second Embodiment

Hereinafter, an electric power tool according to the present embodiment will be described. Note that points having the same or similar configurations as those of the other embodiments are denoted by the same or similar names or reference signs and description thereof will be omitted or simplified, and different points will be mainly described.

The reinforcing bar binding machine (an example of the "electric power tool") according to the present embodiment is configured to perform drive control of motors (the binding motor 18M and the feeding motor 12M) while receiving an update program of a control program, thereby enabling to perform work using the electric power tool.

First, a worker attaches the main battery 10BP to a lower end of the handle 10H, or turns on the power supply switch 40S of the reinforcing bar binding machine 10 to which the battery 10BP is attached, and starts work using the reinforcing bar binding machine 10. At this time, since the DC voltage from the first battery is applied to the first voltage line 41, the first voltage line 41 has a voltage of 14.4 V. When the worker presses the trigger 10HT in this state, the drive controller 22 starts drive control of the motors (the binding motor 18M and the feeding motor 12M).

Simultaneously, the main battery 10BP supplies electric power to the communication portion 30. Specifically, the first electric power controller 41PC is configured to generate, based on a DC voltage of 14.4 V corresponding to the first power supply voltage supplied from the battery 10BP, a voltage of 3.3 V that is an operating voltage of the communication controller 34, and configured to supply the generated voltage to the communication controller 34 via the second voltage line 42. Accordingly, the communication controller 34 starts controlling the communication device 32 and receives an update program of the firmware.

Accordingly, the reinforcing bar binding machine 10 is configured such that the communication device 32 can receive the update program of the firmware while the motors (the binding motor 18M and the feeding motor 12M) are driven.

When the communication device 32 starts reception of the update program, the processor 34P of the communication controller 34 sequentially stores the received update program in the volatile memory 34VM.

Next, the processor 22P of the drive controller 22 or the processor 34P of the communication controller 34 accesses the volatile memory 34VM via a bus, and sequentially stores the update program in the second storage section NVM2. When the processor 34P of the communication controller 34 stores the update program in the second storage section NVM2, the control of the drive controller 22 over the electric motor can be suppressed from being hindered.

Even after the update program is stored, the drive controller 22 controls the motors (the binding motor 18M and the feeding motor 12M) based on the control program before the update.

After finishing the work, the worker removes the main battery 10BP from the lower end of the handle 10H, or turns off the power supply switch 40S. In a case of a short break or the like, the worker may turn off the power supply switch 40S with the battery 10BP attached.

When starting the work, the worker attaches the main battery 10BP to the lower end of the handle 10H or turns on the power supply switch 40S. At this time, in a case where the communication device 32 completes the reception of the entire update program and the entire update program is stored in the second storage section NVM2, the processor 22P of the drive controller 22 executes the update program stored in the second storage section NVM2 not the control program stored in the first storage section NVM1, and drives the electric motors (the feeding motor 12M and the binding motor 18M) based on the update program.

As described above, according to the electric power tool of the present embodiment, the update program can be received and updated even during work using the electric motors. In addition, since it is not necessary for the worker to wait for the start of the work until the completion of the FOTA, the work efficiency can be improved.

Third Embodiment

Hereinafter, an electric power tool according to the present embodiment will be described. Note that points having the same or similar configurations as those of the other embodiments are denoted by the same or similar names or reference signs and description thereof will be omitted or simplified, and different points will be mainly described.

A reinforcing bar binding device (an example of the "electric power tool") according to the present embodiment is attachable to a robot arm (an example of "equipment"). Further, the binding device is configured to receive a DC power supply from the robot arm. Therefore, different from the reinforcing bar binding machine according to the first embodiment, the binding device according to the present embodiment does not include a handle or a battery attaching and detaching portion.

In addition, the binding device according to the present embodiment is configured to simultaneously execute reception of an update program by a communication device, storage of the update program in a second storage section, and execution of a control program by a control processor. Therefore, the binding device can execute the FOTA while driving an electric motor to perform binding work of reinforcing bars, it is possible to improve work efficiency.

As described, also in the binding device according to the present embodiment, a first storage section and the second storage section, which are two storage sections, are provided in a non-volatile memory, and thus it is not necessary to wait for the start of the work until the completion of the FOTA. Thus, it is possible to improve the work efficiency.

Various modifications can be made without departing from the gist of the present invention. For example, it is possible to add other known techniques to a part of the constituent elements of an embodiment within the scope of the ordinary creative ability of those skilled in the art. A part of constituent elements of an embodiment may be replaced with other known techniques. For example, the drive controller and the communication controller can operate at different voltages. The update program is not limited to an update program for updating the entire control program. For example, the update program may be a part of a module of the control program or may be an update program (module) for updating a part of control data. Further, the update program may be an update program related to an additional function added to the control program.

What is claimed is:

1. An electric power tool comprising:
    an electric motor;
    a communication device;
    a first controller including a first storage section configured to store a control program for driving the electric motor, a second storage section configured to store an update program of the control program that is to be received by the communication device, and a processor configured to drive the electric motor by executing the control program after the communication device starts reception of the update program;

a first battery;
a second battery;
a first voltage supply portion configured to supply, based on a first power supply voltage supplied from the first battery, a first operating voltage for operating the first controller;
a second controller configured to control the communication device; and
a second voltage supply portion configured to supply, based on the first power supply voltage supplied from the first battery, a second operating voltage for operating the second controller, and configured to supply, based on a second power supply voltage supplied from the second battery, the second operating voltage for operating the second controller,
wherein when the first power supply voltage is not supplied from the first battery,
the second controller is configured to control the communication device in order to receive the update program, at the second operating voltage supplied based on the second power supply voltage supplied from the second battery, and
the first controller is configured to store the update program in the second storage section, at the first operating voltage supplied based on the second power supply voltage supplied from the second battery.

2. The electric power tool according to claim 1, wherein the processor is configured to execute the control program stored in the first storage section, before the communication device completes the reception of the entire update program.

3. The electric power tool according to claim 2, wherein the processor is configured to execute the update program stored in the second storage section, in a case where the communication device completes the reception of the entire update program and the entire update program is stored in the second storage section.

4. The electric power tool according to claim 1, wherein the first controller is configured to drive the electric motor by causing the processor to execute the control program while storing the update program received by the communication device in the second storage section.

5. The electric power tool according to claim 1, wherein the electric motor is configured to drive a binding portion configured to bind reinforcing bars using a wire,
the control program is for driving the electric motor to drive the binding portion, and
the electric power tool is a reinforcing bar binding machine configured to bind the reinforcing bars using the wire.

6. The electric power tool according to claim 1, wherein when the communication device shifts from a state where the first power supply voltage is not supplied from the first battery to a state where the first power supply voltage is supplied from the first battery during reception of the update program,
the second controller is configured to control the communication device, at the second operating voltage supplied based on the first power supply voltage supplied from the first battery, and
the first controller is configured to drive the electric motor based on the control program, at the first operating voltage supplied based on the first power supply voltage supplied from the first battery.

7. The electric power tool according to claim 1, further comprising:
a first voltage line configured to connect the first voltage supply portion and the second voltage supply portion and configured to supply the first power supply voltage; and
a second voltage line configured to connect the first voltage supply portion and the second voltage supply portion and configured to supply a second voltage lower than the first power supply voltage,
wherein when the first power supply voltage is not supplied from the first battery to the first voltage line,
the second voltage supply portion is configured to supply the second operating voltage to the second controller based on the second power supply voltage supplied from the second battery, and configured to supply the second voltage to the second voltage line, and
the first voltage supply portion is configured to supply the first operating voltage to the first controller based on the second voltage supplied to the second voltage line.

8. The electric power tool according to claim 7, further comprising:
a first circuit board on which the first controller and the first voltage supply portion are mounted;
a second circuit board on which the second controller and the second voltage supply portion are mounted;
a first connector provided on the first circuit board;
a second connector provided on the second circuit board; and
a cable configured to connect the first connector and the second connector and including a power supply line constituting at least a part of the first voltage line and a power supply line constituting at least a part of the second voltage line.

9. The electric power tool according to claim 1, wherein the electric power tool is attachable to equipment.

* * * * *